(12) United States Patent
Schweid

(10) Patent No.: US 7,565,026 B2
(45) Date of Patent: Jul. 21, 2009

(54) INTERPOLATION OF IMAGE CORRECTION PARAMETERS

(75) Inventor: Stuart Alan Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 609 days.

(21) Appl. No.: 11/319,242

(22) Filed: Dec. 28, 2005

(65) Prior Publication Data

US 2007/0147695 A1    Jun. 28, 2007

(51) Int. Cl.
G06K 9/40 (2006.01)
G06K 9/32 (2006.01)

(52) U.S. Cl. ..................... 382/254; 382/300
(58) Field of Classification Search ............... 382/167, 382/254, 274, 275, 300, 312; 347/19, 240, 347/251; 358/1.9
See application file for complete search history.

(56) References Cited

U.S. PATENT DOCUMENTS

| | | | |
|---|---|---|---|
| 5,774,761 A | 6/1998 | Rai | |
| 6,819,352 B2 * | 11/2004 | Mizes et al. | 347/240 |
| 7,095,531 B2 * | 8/2006 | Mizes et al. | 358/1.9 |
| 7,125,094 B2 * | 10/2006 | Mizes | 347/19 |
| 2006/0072128 A1 * | 4/2006 | Ng et al. | 358/1.9 |

* cited by examiner

*Primary Examiner*—Kanji Patel
(74) *Attorney, Agent, or Firm*—Miele Law Group PC

(57) ABSTRACT

Apparatus are provided, including a macrouniformity compensation mechanism to modify data exchanges between device-independent image data and a one-dimensional imaging device, to compensate for a lack of macrouniformity caused by the one-dimensional imaging device. The macrouniformity compensation mechanism includes an input-output value converter to convert an input intensity value for a given pixel to a corresponding output intensity value. The output intensity value is determined as a function of the position of the given pixel in the cross-process direction of the image and the level of the input intensity value. The input-output value converter includes a number of stored conversion parameter sets corresponding to respective different positions in the cross-process direction of the pixel data. The number of stored conversion parameter sets is a fraction of the total number of pixel positions in the cross-process direction of the pixel data.

20 Claims, 3 Drawing Sheets

ID OF IMAGE CORRECTION PARAMETERS

NOTICE OF COPYRIGHT

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

The present disclosure, in certain respects, relates to imaging devices (e.g., printers) or image capture devices (e.g., copiers or scanners), which include mechanisms to compensate for macrouniformity problems in scanning or printing a document.

BACKGROUND

One-dimensional imaging devices include imaging devices, such as printers, and image capturers, such as scanners and photocopiers. These devices may introduce intensity variations in an image along a cross-process direction. The cross-process direction is, for example, a direction along the document parallel to the scanning path and perpendicular to the direction in which the document moves (e.g., the feeding direction) in relation to the imaging device when the image is either printed or scanned. These variations may be called "a macro-uniformity problem," where the variation in intensity is slow from one side of the image to the other, or "streakiness" where the variation in intensity occurs in spikes or in bands.

Various techniques exist to cure or mitigate these problems, by modifying the image data sent to a printer or the image data acquired by an image capturing device. For example, the image grey values may be modified as a function of the pixel position along the cross-process position. One way to accomplish this is to provide, for each pixel in the image (for each separation), a unique 256 point image modification or correction function, which may be implemented as a look-up table (LUT). For a 12 inch wide printer at 600 pixels per square inch (PSI), this requires 7200 LUTs to be stored and accessed. This may cause, among other problems, taxing of the image processor's memory.

SUMMARY

Apparatus are provided, which include a macrouniformity compensation mechanism to modify data exchanges between device-independent image data and a one-dimensional imaging device, to compensate for a lack of macrouniformity caused by the one-dimensional imaging device. The macrouniformity compensation mechanism includes an input-output value converter to convert an input intensity value for a given pixel to a corresponding output intensity value. The output intensity value is determined as a function of a position of the given pixel in the cross-process direction of the image and the intensity level of the input intensity value. The input-output value converter includes a number of stored conversion parameter sets corresponding to respective different positions in the cross-process direction of the pixel data. The number of stored conversion parameter sets is a fraction of the number of pixel positions in the cross-process direction.

BRIEF SUMMARY OF THE DRAWINGS

Embodiments of the disclosure are further described in the detailed description which follows, by reference to the noted drawings, in which like reference numerals represent similar parts throughout the several views of the drawings, and wherein.

DETAILED DESCRIPTION

In embodiments herein, a given image may refer to a pattern (e.g., an array) of pixels. Each pixel corresponds to a defined location in the image (for example, a grid cell), and may comprise tone information. In embodiments herein, tone information may refer, for a given point (for example, corresponding to a pixel) or region of an image, to a color component (related to one or more frequencies of visible light) and an intensity component (related to a radiant intensity of the pixel).

In a color image, by way of example, a given pixel may have tone information defined in terms of a number of different color values. For example, those values may be R for red, G for green, and B for blue, or those values may be C for cyan, M for magenta, Y for yellow, and K for black. In simplified terms, the magnitude of each of these values represents the intensity of the individual color at the pixel's location. In a grey scale image, a pixel generally has only one color value—grey, and its magnitude is representative of the shade of grey (generally related to the intensity of that color) in the pixel.

Figure 1:
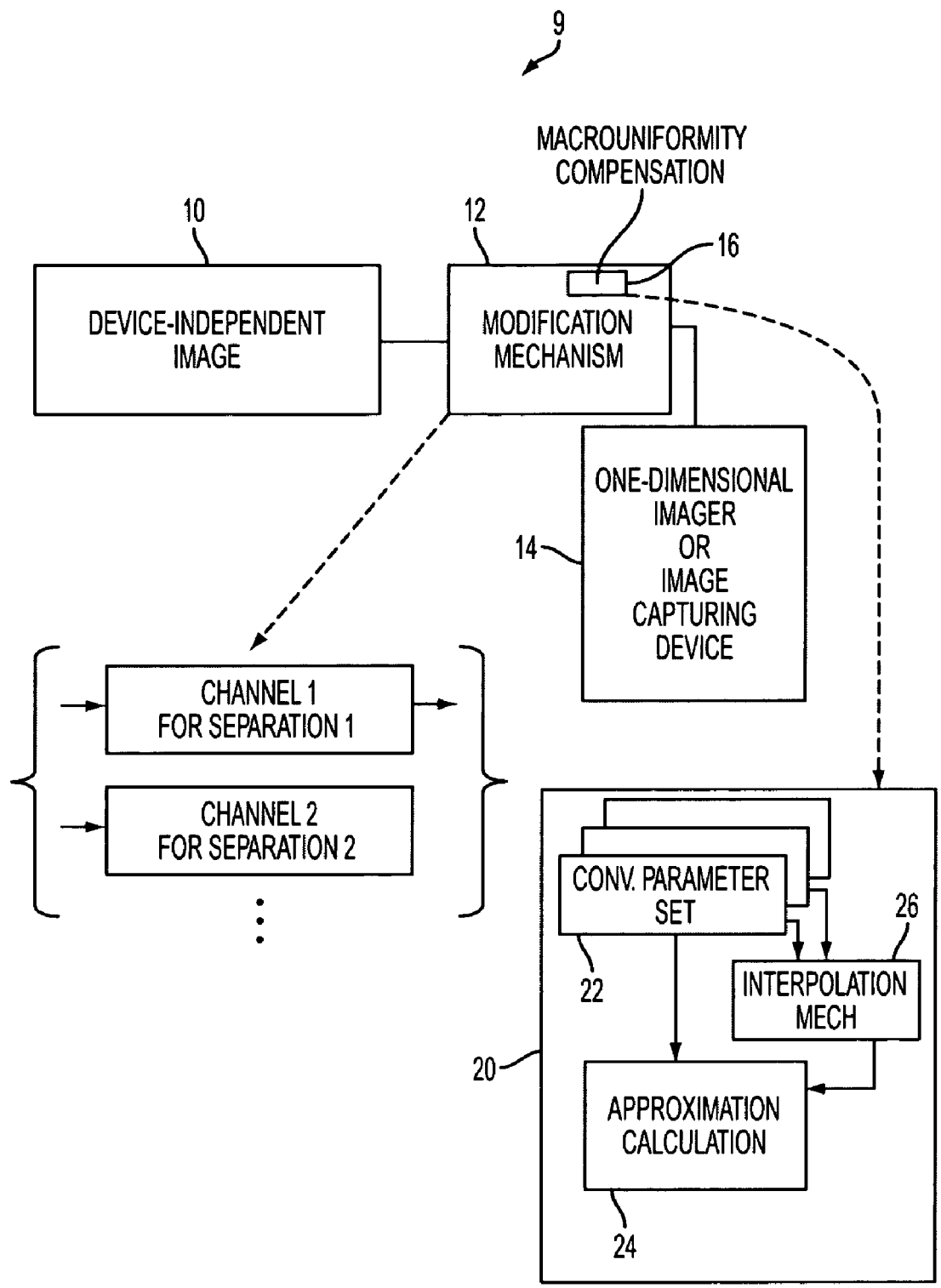
FIG. 1 is a block diagram of an imaging system.

Referring now to the drawings in greater detail, FIG. 1 shows an imaging system 9. The illustrated imaging system 9 may be an imager, for example, a printer, and/or an image capturer, for example, a scanner or photocopier device. The illustrated imaging system has a one-dimensional imaging device 14 which may include a one-dimensional imager and/or an image capturing device, and which scans in a given cross-process direction to either print image information on a document or to scan image information from the document.

A device-independent image 10 is provided which includes device-independent data including pixel data representing a physical image. A modification mechanism 12 is provided to modify data exchanges between the device-independent image data 10 and the one-dimensional imaging device 14.

The modification mechanism 12 generally includes a separate channel for each separation in the image being processed. Accordingly, as illustrated in FIG. 1, channel 1 is provided for separation 1, channel 2 is provided for separation 2, and so on.

The illustrated modification mechanism 12 may include, for example, a halftoner, where the system includes a printer. The modification mechanism may include an image data file producer to produce image files (e.g., TIFF files, pdf files, etc.) where the system includes an image capturing device.

The modification mechanism 12 includes a macrouniformity compensation mechanism 16, to modify data exchanges between the device-independent image 10 and the one-dimensional imaging device 14. Specifically, the macrouniformity compensation mechanism 16 mitigates a lack of macrouniformity in a physical image caused by an imager, or reduces artifacts present in device-independent image data caused by an image capturer.

In the illustrated embodiment, the macrouniformity compensation mechanism 16 includes an input-output value converter 20, which includes stored conversion parameter sets 22 and an approximation calculation mechanism 24. Approximation calculation mechanism 24 calculates an approximation of the output level for a given input level at the corresponding pixel position, based upon a corresponding conversion parameter set 22. If, for a particular pixel position along the cross-process direction, there is no pre-stored conversion parameter set 22, a conversion parameter set can be calculated by interpolating one or more nearby conversion parameter sets. This is done by an interpolation mechanism 26, provided to perform an interpolation to ascertain an output level for a given pixel for a given input level for which there is no corresponding stored conversion parameter set 22. In the illustrated embodiment, the conversion parameter sets 22 for the two closest nearby pixel positions on either side of the given pixel position are interpolated to ascertain the output level for the given pixel position.

Figure 2:
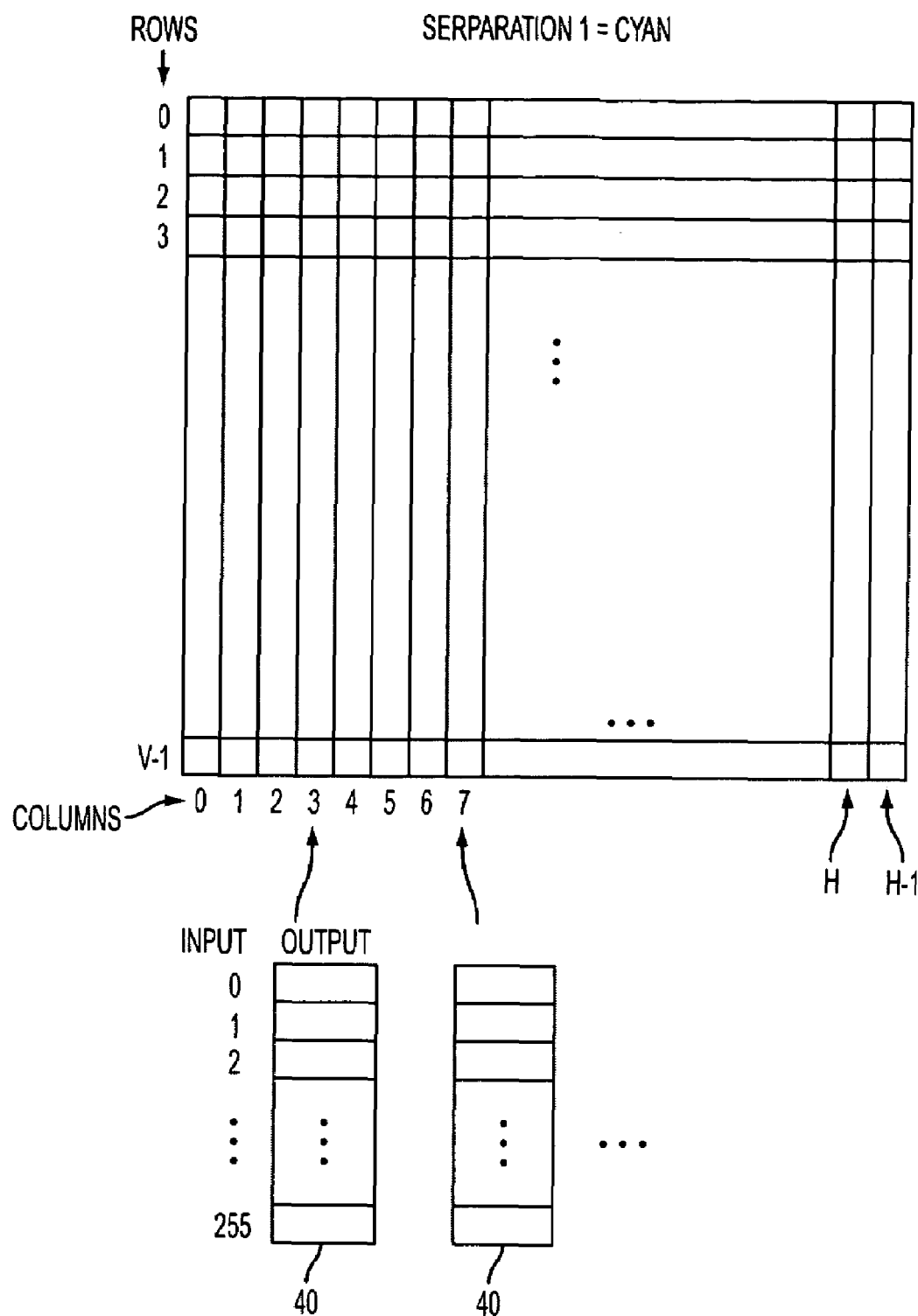
FIG. 2 is a schematic diagram representing look-up tables (LUTs) for a single channel of the system shown in FIG. 1.

FIG. 2 shows separation 1, which in the example is cyan. Conversion parameter sets 40 are provided, which include a TRC lookup table (LUT) provided at every Nth position (e.g., every $4^{th}$ position as shown) along the cross-process direction of the image. In the illustrated embodiment, each TRC LUT has 256 values.

The separation 1 illustrated in FIG. 2 is divided into pixel data values, each value being an intensity level of the color cyan for a particular pixel location at a particular row and column intersection. The illustrated separation has V rows and H columns. While the illustrated image format arranges pixels in an H×V matrix, other pixel arrangements are possible. For example, pixels may be arranged in accordance with an unlimited different amount of existing or yet-to-be-developed pixel sampling schemes. Some known examples include the checker scheme, the grid, the RGSS, the rooks, etc.

Rather than provide stored conversion parameter sets in the form of look-up tables as shown in FIG. 2, the number of output values represented by a given TRC look-up table may be reduced and represented by a set of weight values. In other words, each stored conversion parameter set may include weight values used in connection with basis functions to ascertain an output level for a given input level at the corresponding pixel position.

Figure 3:
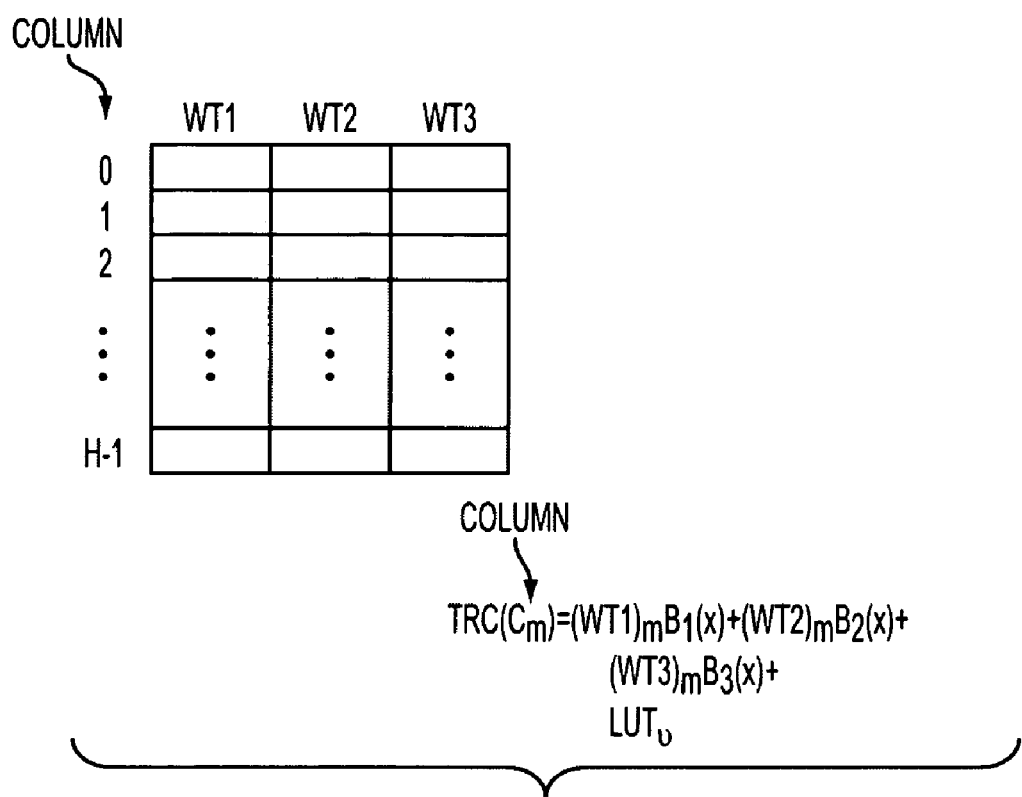
FIG. 3 is a schematic diagram illustrating stored weight values and a tone reproduction curve (TRC)-output intensity value equation.

As shown in FIG. 3, each stored conversion parameter set includes three weight values (wt1, wt2, and wt3). A separate stored conversion parameter set is provided for a first position "0" along the cross-process direction, for a second position "1" along the cross-process direction, and so on up until an $H^{th}$ position "H-1". In the illustrated embodiment, the positions 0, 1, ... H-1 correspond to every fourth pixel along the cross-process direction of the separation.

These weight values may be stored directly, for example, in a table, or as increments from one weight value to the next.

In the illustrated embodiment, the interpolation is performed on weight values (wt1, wt 2, and wt 3), to ascertain interpolated weight values wt1, wt2 and wt3 for the given pixel position for which there is no corresponding stored conversion parameter set 22.

In the illustrated embodiment, assuming a 12 inch wide printer at 600 pixels per square inch, a set of weight values is provided for every $4^{th}$ pixel in the cross-process direction, i.e., in the horizontal direction of the image. The approximation calculation function may generally be represented by:

$$LUT_n(x) = LUT_v + \Sigma_i \omega_{i,n} B_i(x) \quad \text{(eqn. 1)}$$

$LUT_n(x)$ is the look-up table (LUT) or TRC at the nth pixel location. $LUT_v$ is the mean of the 7200 correction LUTs; B(x) is a set of basis functions (where $B_i(x)$ is the $i^{th}$ basis function); and $\omega_{i,n}$ is the weight or coefficient of the $i^{th}$ basis function at position n. The variable x represents the particular intensity level of the input value which corresponds to the output LUT value. In the illustrated method, a small set of weight values, for example 2 or 3, is stored for each pixel location along the cross-process direction. In the illustrated example, data is stored at a fraction of the pixel locations along the cross-process direction. Specifically, the data in the example is stored at every $4^{th}$ pixel location along the cross-process direction. In the illustrated example, the number of basis functions used is 3, as shown in FIG. 3.

To ascertain the output level for a given input level for which there is no corresponding set of weight values, interpolation may be performed on the stored weight values for the nearby surrounding pixel positions at each side of the given pixel position.

By way of example, one may assume that output values are known at positions k and k+m, an interpolation must be performed to determine the weight values at a location k+q, which is between k and k+m. The output level equation, for this situation is:

$$LUT_{k+q}(x) = \{(M-q) * \{LUT_v + \Sigma_i \omega_{i,k} B_i(x)\} + q*(LUT_v + \Sigma_i \omega_{i,k+m} B_i(x))\}/m$$

However, rather than performing an interpolation between the output values as shown in equation 2 above, the weights at the sample points may be interpolated to determine the weight at any point in between, in accordance with:

$$\omega_{i,k+q} = \{(m-q)*\omega_{i,k} + q*\omega_{i,k+m}\}/m$$

Accordingly, this equation can be used in connection with equation 1 above, to calculate the output level at any point along the cross-process direction. The illustrated example uses linear interpolation, but alternate interpolations schemes and different sub-sample factors may be used in other embodiments.

The processing or functions performed by the elements described above may be performed by a general purpose computer and/or by a specialized processing computer, either separate from or as part of a specialized hardware device. Such processing or functions may be performed by a single platform or by a distributed processing platform. In addition, such processing or functions can be implemented in the form of special purpose hardware or in the form of software run by a computer. Any data handled in such processing or created as a result of such processing can be stored in any type of memory. By way of example, such data may be stored in a temporary memory, such as in a RAM (random access memory) of a given computer. In addition, or in the alternative, such data may be stored in longer-term storage devices, for example, magnetic discs, rewritable optical discs, and so on. For the disclosure herein, machine-readable media encoded with data may comprise any form of data storage mechanism, included the above-noted different memory technologies, as well as any hardware or circuit representations of the encoded data.

The claims as originally presented and as they may be amended, encompass variations, alternatives, modifications, improvements, equivalents and substantial equivalents of the embodiments and teachings disclosed herein, including those that are presently unforeseen or unappreciated, and that, for example, may arise from applicants/patentees and others.

What is claimed is:

1. Apparatus comprising:
a macrouniformity compensation mechanism to modify data exchanges between the device-independent image data and a one-dimensional imaging device to compensate for a lack of macrouniformity caused by the one-dimensional imaging device, the one-dimensional imaging device converting from one to the other of (i) a physical image and (ii) the device-independent image data including pixel data representing the physical image;
the macrouniformity compensation mechanism including an input-output value converter to convert an input intensity value for a given pixel to a corresponding output intensity value, the corresponding output intensity value being determined as a function of a position of the given pixel in the cross-process direction of the image and the level of the input intensity value;
the input-output value converter including a number of stored conversion parameter sets corresponding to respective different positions in the cross-process direction of the pixel data, the number of stored conversion parameter sets being a fraction of a total number of pixel positions in the cross-process direction of the pixel data.

2. The apparatus according to claim 1, further comprising the one-dimensional imaging device, wherein the imaging device includes an imager.

3. The apparatus according to claim 2, wherein the imager is a printer.

4. The apparatus according to claim 1, further comprising the one-dimensional imaging device, wherein the imaging device includes an image capturer.

5. The apparatus according to claim 4, wherein the image capturer includes at least one of a scanner and a photocopier.

6. The apparatus according to claim 1, further comprising a modification mechanism to modify data exchanges between the device-independent image data and the one-dimensional imaging device, the modification mechanism including the macrouniformity compensation mechanism.

7. The apparatus according to claim 1, wherein each of the stored conversion parameter sets defines an input level in relation to an output level at a corresponding position within the pixel data along the cross-process direction.

8. The apparatus according to claim 1, wherein a stored conversion parameter set for a given pixel position includes tone reproduction curve output values corresponding to possible input value levels.

9. The apparatus according to claim 1, wherein the number of stored conversion parameter sets fraction is one-eighth of the number of pixel positions in the cross-process direction.

10. The apparatus according to claim 1, wherein the input-output value converter further includes an interpolator to perform an interpolation to ascertain an output level for a given input value for a given pixel position for which there is no corresponding stored conversion parameter set, the interpolation being performed on a stored conversion parameter set for a nearby pixel position.

11. The apparatus according to claim 10, wherein the interpolator is a linear interpolator.

12. The apparatus according to claim 10, wherein the stored conversion parameter sets include weight values, and wherein the interpolation is performed on weight values for a nearby pixel position to ascertain weight values for the given pixel position.

13. The apparatus according to claim 10, wherein the interpolation is performed on output level values for closest nearby pixel positions on either side of the given pixel position, to ascertain the output level value for the given pixel position.

14. The apparatus according to claim 1, wherein the output value for the given position in the cross-process direction is a tone reproduction curve (TRC) value determined as a function of an input level at the given position, the TRC value being equal to an empirically determined mean TRC value plus a sum of weighted basis functions, the weighted basis functions being weighted in accordance with values either from the stored conversion parameter set for the given position or from the stored conversion parameter set for a position in the cross-process direction that is nearby the given position.

15. A method comprising:
performing one-dimensional imaging to convert from one to the other of (i) a physical image and (ii) device-independent image data including pixel data representing the physical image;
performing a macrouniformity compensation to modify data exchanges between the device-independent image data and the one-dimensional imaging device, to compensate for a lack of macrouniformity caused by the one-dimensional imaging device;
the macrouniformity compensation including converting an input intensity value for a given pixel to a corresponding output intensity value, the corresponding output intensity value being determined as a function of a position of the given pixel in the cross-process direction of the image and the level of the input intensity value;
the input-output value conversion including providing a number of stored conversion parameter sets corresponding to respective different positions in the cross-process direction of the pixel data, the number of stored conversion parameter sets being a fraction of a total number of pixel positions in the cross-process direction of the pixel data.

16. The method according to claim 15, wherein the stored conversion parameter sets for a given pixel position includes tone reproduction curve output values corresponding to possible input value levels.

17. The method according to claim 15, wherein the conversion further includes interpolating to ascertain an output level for a given input value for a given pixel position for which there is no corresponding stored conversion parameter set, the interpolation being performed on a stored conversion parameter set for a nearby pixel position.

18. The method according to claim 15, wherein the output value for the given position in the cross-process direction is a tone reproduction curve (TRC) value determined as a function of an input level at a given position, the TRC value being equal to an empirically determined mean TRC value plus a sum of weighted basis functions, the weighted basis functions being weighted in accordance with values either from the stored conversion parameter set for the given position or from the stored conversion parameter set for a position in the cross-process direction that is nearby the given position.

19. Computer-readable media encoded with data, the encoded data interoperable with a computer to cause:
providing a one-dimensional imaging device to convert from one to the other of (i) a physical image and (ii) device-independent image data including pixel data representing the physical image;
performing a macrouniformity compensation to modify data exchanges between the device-independent image data and the one-dimensional imaging device, to compensate for a lack of macrouniformity caused by the one-dimensional imaging device;

the macrouniformity compensation including converting an input intensity value for a given pixel to a corresponding output intensity value, the corresponding output intensity value being determined as a function of a position of the given pixel in the cross-process direction of the image and the level of the input intensity value;

the input-output value conversion including providing a number of stored conversion parameter sets corresponding to respective different positions in the cross-process direction of the pixel data, the number of stored conversion parameter sets being a fraction of a total number of pixel positions in the cross-process direction of the pixel data.

20. Computer-readable media according to claim 19, wherein the output value for the given position in the cross-process direction is a tone reproduction curve (TRC) value determined as a function of an input level at a given position, the TRC value being equal to an empirically determined mean TRC value plus a sum of weighted basis functions, the weighted basis functions being weighted in accordance with values either from the stored conversion parameter set for the given position or from the stored conversion parameter set for a position in the cross-process direction that is nearby the given position.

* * * * *